United States Patent [19]

Ferguson

[11] Patent Number: 4,582,278
[45] Date of Patent: Apr. 15, 1986

[54] AIR FOIL HAVING ADJUSTABLE SHAPE

[75] Inventor: Stuart R. Ferguson, Beverly Hills, Calif.

[73] Assignee: Northrop Corporation, Hawthorne, Calif.

[21] Appl. No.: 702,157

[22] Filed: Feb. 15, 1985

[51] Int. Cl.$^4$ .............................................. B64C 3/46
[52] U.S. Cl. .................................................. 244/219
[58] Field of Search ................... 244/219, 219 A, 213, 244/214, 215, 198, 201

[56] References Cited

U.S. PATENT DOCUMENTS 3,447,768  6/1969  McQueen .......................... 244/219

FOREIGN PATENT DOCUMENTS 2246444  5/1975  France ................................ 244/219
279904  11/1930  Italy .................................... 244/219

*Primary Examiner*—Galen L. Barefoot
*Assistant Examiner*—Rodney Corl
*Attorney, Agent, or Firm*—Terry J. Anderson

[57] ABSTRACT

An airfoil with an adjustable aerodynamic shape for lowering the landing speed of high performance aircraft. A thin secondary skin is applied to the top primary skin of the aircraft's wing surface. Pressurized fluid is introduced to the cavity formed between the primary skin and the secondary skin to cause a rounding of the upper surface of the airfoil in conjunction with lowering of leading and trailing edge flaps. A plurality of contour members of predetermined lengths and at spaced locations connect the secondary skin and upper surface of the primary skin so as to define the particular contour desired. The leading edge of the secondary skin is hinged to the forward spar of the airfoil. One or more actuators acting through a linkage apply tension to the trailing edge of the secondary skin and draw it down into contiguous relationship with the primary skin of the wing surface for high speed operation.

9 Claims, 8 Drawing Figures

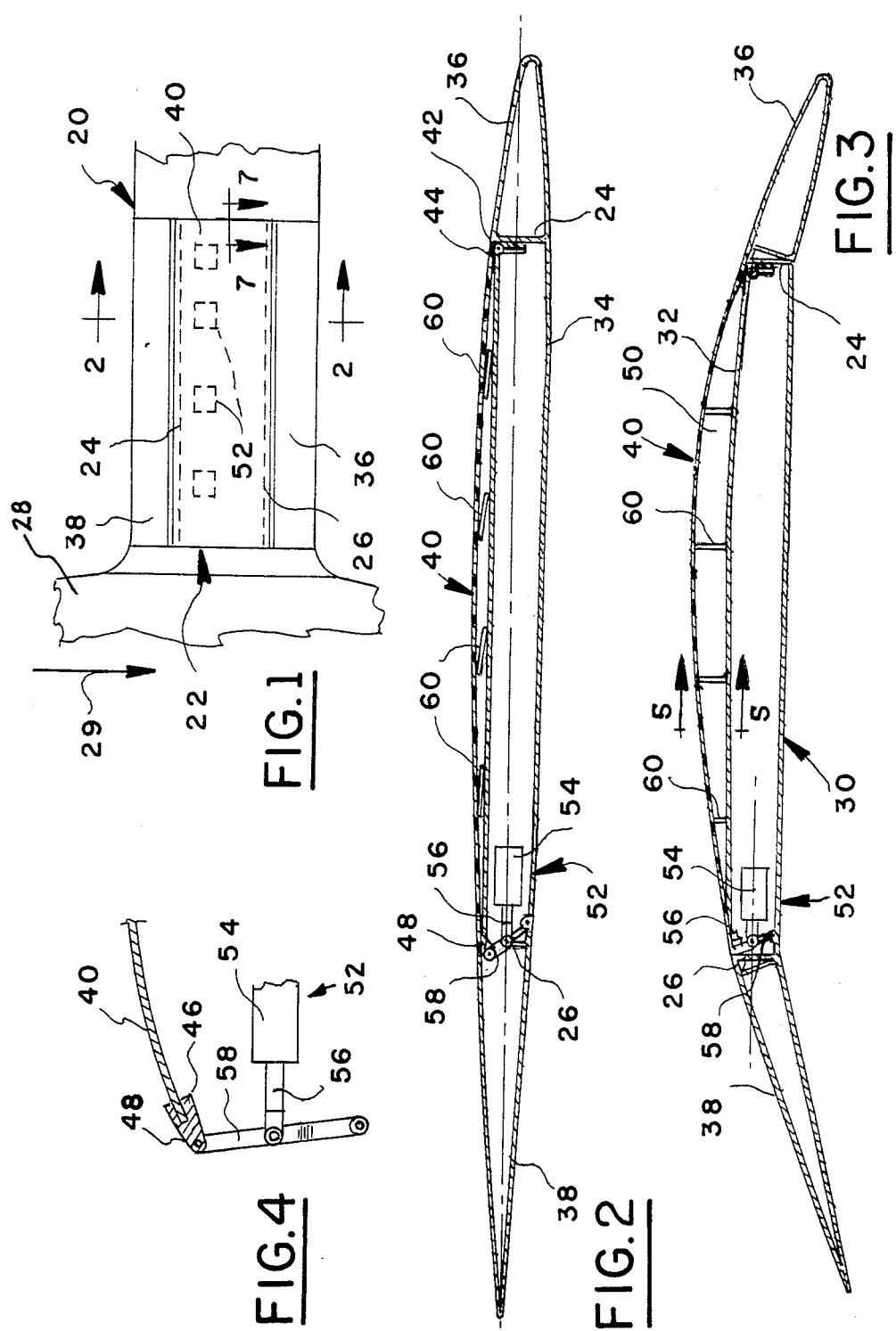

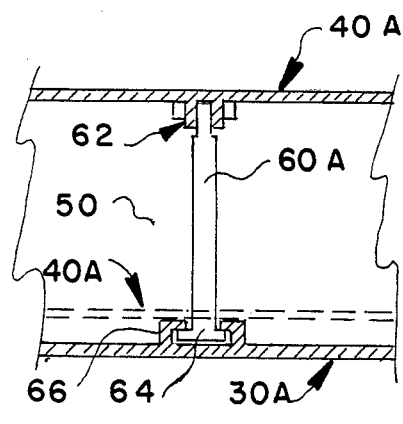
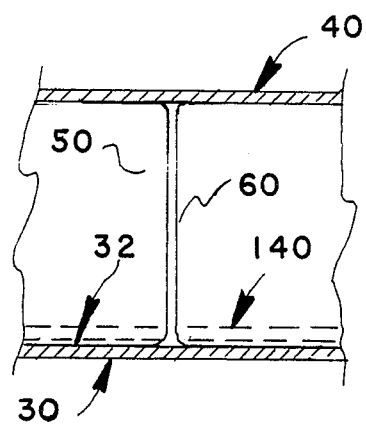
FIG. 6    FIG. 5
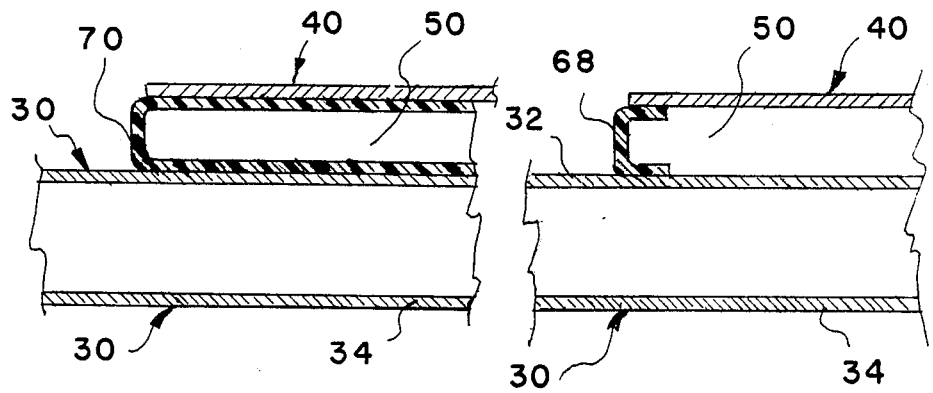
FIG. 8    FIG. 7

AIR FOIL HAVING ADJUSTABLE SHAPE

BACKGROUND OF THE INVENTION

I. Field of Invention

This invention relates generally to airfoils having adjustable aerodynamic shapes and, particularly, to an airfoil having an expandable surface which, in conjunction with the lowering of leading and trailing edge flaps, is effective to lower the landing speed of high performance craft.

II. Description of a Prior Art

It is well known that the maximum lift coefficient of a highly cambered airfoil is greater than that of a flat, thin one. Safety in landing an aircraft requires a low landing speed which is obtainable by using wings with high maximum lift coefficients. At the same time, high maximum speeds can only be obtained by using a thin, low-drag type of airfoil. This situation is aggravated when the aircraft being considered is a high performance aircraft such that low speed operation accounts for a very small, albeit extremely important, time-wise, portion of the operation of the aircraft.

A plethora of devices have been devised over the years for lowering the landing speed of high performance aircraft and thereby increasing their low speed maneuverability and safety of operation. In some instances, such attempts have been directed toward boundary layer control; that is, control of the layers of air which are intimate or in immediate contact with the outer surfaces of the airfoil. Thus, airfoils have been modified to incorporate slots or guides for directing airflow in a particular manner. Also, devices for blowing air over the surfaces of the airfoil or for drawing air away from the surfaces of the airfoil have been utilized. Numerous other devices have been devised or attempted, many of which have been complex or inefficient in their intended function or utilization of energy.

Expedients for lowering landing speeds which have been used successfully and, indeed, are standard on substantially all high performance aircraft include leading and trailing edge flaps. When raised, the flaps customarily blend with the contour of the remainder of the airfoil resulting in low camber and minimum drag for high speed flight. When lowered, the flaps increase the camber of the airfoil and provide the airfoil with maximum lift.

Unfortunately, one draw-back of such flaps resides in the transition angle which occurs at the interface between a flap and the main supporting section of the airfoil. Specifically, the planes of the upper surfaces of the flaps, when lowered, are angularly disposed relative to a plane of the upper surface of the airfoil's main supporting section. This situation causes undesirable turbulence across the upper surface of the airfoil which significantly detracts from its lifting capabilities.

SUMMARY OF THE INVENTION

It was with recognition of the state of the prior art that the present invention was conceived and has now been reduced to practice. Thus, the invention resides in the provision of an airfoil with an adjustable aerodynamic shape for lowering the landing speed of high performance aircraft.

Specifically, a thin secondary skin is applied to the top primary skin of the aircraft's wing surface. Pressurized fluid is introduced to the cavity formed between the primary skin and the secondary skin to cause a rounding of the upper surface of the airfoil in conjunction with lowering of leading and trailing edge flaps. A plurality of contour members of predetermined lengths and at spaced locations connect the secondary skin and upper surface of the primary skin so as to define the particular contour desired. The leading edge of the secondary skin is hinged to the forward spar of the airfoil. One or more actuators acting through a linkage apply tension to the trailing edge of the secondary skin and draw it down into contiguous relationship with the primary skin of the wing surface for high speed operation.

The cavity may be appropriately sealed at its lateral end locations or one or more bladders may be appropriately received within the cavity for retention of the pressurized fluid. The contour members are designed to withstand the tensile forces applied to them upon inflation of the secondary skin and each of the members is of a unique, predetermined length and properly disposed so that the secondary skin, together with the upper surfaces of the leading edge and trailing edge flaps, result in a smooth, continuous, and unbroken upper surface for the airfoil when it assumes the low speed flight attitude.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings, which are incorporated in and constitute a part of this invention, illustrate some of the embodiments of the invention and, together with the description, serve to explain the principles of the invention in general terms.

DETAILED DESCRIPTION OF THE DRAWINGS

In the drawings:

FIG. 1 is a top plan view illustrating portions of a wing and fuselage of an aircraft embodying the present invention;

FIG. 2 is a cross-section view taken generally along line 2—2 in FIG. 1 illustrating the high speed attitude of the airfoil;

FIG. 3 is a cross-section view similar to FIG. 2 illustrating the low-speed attitude of the airfoil;

FIG. 4 is a detailed side elevation view of an actuating mechanism for the invention, certain parts being in section;

FIG. 5 is a cross-section view taken generally along line 5—5 in FIG. 3;

FIG. 6 is a cross-section view similar to FIG. 5 illustrating another embodiment thereof;

FIG. 7 is a detailed cross-section view taken generally along line 7—7 in FIG. 1; and FIG. 8 is a cross-section view similar to FIG. 7 illustrating another embodiment thereof.

DESCRIPTION OF THE PREFERRED EMBODIMENTS

Referring now to the drawings, FIGS. 1, 2, and 3 generally illustrate an airfoil which incorporates the principles of the present invention.

In accordance with the invention, an airfoil is disclosed which includes a main supporting section having a laterally extending forward spar, a substantially coplanar laterally extending aft spar longitudinally spaced therefrom, a primary skin covering said main supporting section and defining upper and lower surfaces, a leading edge flap pivotally mounted to said forward spar for movement between a raised high speed attitude and lowered low speed attitude, and a trailing edge flap pivotally mounted to said aft spar for movement between a raised, high speed attitude and a lowered, low speed attitude.

More specifically, the figures show the improvement comprising a secondary skin having a leading edge and a trailing edge covering at least a portion of said upper surface of said main supporting section and defining a cavity therebetween adapted to receive high pressure fluid; hinge means pivotally mounting said leading edge of said secondary skin to said forward spar; actuating means within said main supporting section attached to said trailing edge of said secondary skin for applying tension thereto, said actuating means being movable between a tensioning position for drawing said secondary skin to a deflated, high speed condition in contiguous relationship with said upper surface of said main supporting section and a relaxed position permitting said secondary skin to assume an inflated, low speed condition spaced from said upper surface when said high pressure fluid is received within the cavity; and a plurality of spaced apart elongated contour members located within the cavity mounted at their ends to said secondary skin and to said upper surface of said main supporting section, respectively, each of said contour members being movable between an inactive position sandwiched between said secondary skin and said upper surface when said actuating means is in said tensioning position and an active position extending transverse thereto for defining the contour of said secondary skin when said secondary skin assumes said inflated position. The secondary skin assumes said inflated condition when said leading edge flap and said trailing edge flap are in said lowered attitude for low speed flight. The secondary skin assumes said deflated condition when said leading edge flap and said trailing edge flap are in said raised attitude for high speed flight.

As embodied herein, and with continuing reference to FIGS. 1–3, a wing or airfoil 20 is seen including a main supporting section 22 having a laterally extending forward spar 24 and a substantially coplanar laterally extending aft spar 26. The spars 24 and 26 are substantially parallel to one another and spaced from each other in a longitudinal direction.

As used herein, the term "longitudinal" is taken to mean generally parallel to a longitudinal axis of a fuselage 28 of an aircraft to which the airfoil 20 is attached. Direction of flight of the aircraft is indicated by an arrow 29. Similarly, the term "lateral" is taken to mean a direction transverse to the longitudinal axis of the fuselage 28.

As particularly well seen in FIG. 3, a primary, or conventional, skin 30 covers the main supporting section 22 between the forward spar 24 and the aft spar 26 and defines an upper surface 32 and a lower surface 34 of the main supporting section 22.

As particularly well seen in FIGS. 2 and 3, a leading edge flap 36 extends in a lateral direction and is pivotally mounted to the forward spar 24 in a known fashion for movement between a raised, high speed attitude (FIG. 2) and a lowered, low speed attitude (FIG. 3). In a similar fashion, a trailing edge flap 38 is pivotally mounted to the aft spar 26 for movement between a raised, high speed attitude (FIG. 2) and a lowered, low speed attitude (FIG. 3). The mechanism for raising and lowering the flaps 36 and 38 is also known and forms no part of the present invention.

In keeping with the improvement disclosed herein, the airfoil 20 is provided with a secondary skin 40 which covers at least a portion of the upper surface 32 of the main supporting section 22. As seen in FIG. 1, the secondary skin 40 extends between the flaps 36 and 38. The secondary skin 40 is preferably composed of any suitable light weight but high tensile strength material. A typical thickness may be about 0.020 inches (approximately 0.50 mm) and it may be fabricated from 7075 aluminum alloy or composite material such as graphite. A leading edge 42 of the skin 40 is pivotally mounted to the forward spar 24 by means of a suitable hinge 44. Attachment of the skin 40 to the hinge 44 may be accomplished by means of spot welding or in any other suitable manner. A trailing edge 46 may be reinforced by means of a lightweight, but strong, reinforcing extrusion 48 fabricated, for example, of aluminum (see FIG. 4). The extrusion 48 could be spot welded to the skin 40 if the skin were fabricated of aluminum or other suitable metal or could be attached by means of suitable adhesive in the event the skin 40 were fabricated of a composite material.

As particularly well seen in FIG. 3, then, the secondary skin 40 and the upper surface 32 of the primary skin 30 define a cavity 50 between them which is adapted to receive high pressure fluid for inflating the skin 40 to move it from the deflated condition indicated in FIG. 2 to the inflated condition indicated in FIG. 3. An actuating mechanism 52 is illustrated in FIGS. 2 and 3 which serves to apply tension to the secondary skin 40 to draw it into the deflated, high speed condition illustrated in FIG. 2.

As seen in FIGS. 2 and 3, the actuating mechanism 52 includes a fluid operated motor 54 suitably mounted on the structure of the main supporting section 22 and including a plunger 56 pivotally mounted to a link 58 which is pivoted at one end to structure of the main supporting section 22 and at its other end to the extrusion 48 at the trailing edge of the secondary skin 40. Thus, the actuating mechanism 52 is movable between a tensioning position as seen in FIG. 2 in which the secondary skin 40 is drawn down into contiguous relationship with the upper surface 32 of the primary skin 30 for high speed operation of the aircraft and a relaxed position, as illustrated in FIG. 3, permitting the secondary skin 40 to assume an inflated low speed condition spaced from the upper surface 32 when pressurized fluid is introduced into the cavity 50. A preferable fluid for this purpose is air pressurized to approximately 10 psi.

It will be appreciated that the fluid operated motor 54 may be either an hydraulic or a pneumatic motor, alternatively. Motion may also be achieved by means of an electric motor in which case the plunger 56 would be replaced by a screw threadedly engaged with the link 58.

Refer now to FIGS. 3 and 5 which best illustrate the use of spaced apart elongated contour members 60 located within the cavity 50. The contour members 60 may be composed of high tensile strength filamentary material such as nylon or a composite material such as graphite, while having only minimal compressive strength. They extend from an undersurface of the secondary skin 40 to the upper surface 32 of the primary skin 30 and may be joined at their respective ends by means of suitable high strength adhesive. The contour members 60 have individualized lengths and this feature, coupled with appropriate spacing between the members, assures the proper contour of the secondary skin when it assumes the inflated position. As seen in FIG. 2, the contour members fold flat between the upper surface 32 and the secondary skin 40 when the cavity 50 is deflated and the actuating mechanism 52 operated to draw the secondary skin 40 taut for the high speed condition illustrated in FIG. 2.

Another embodiment of the contour members is illustrated in FIG. 6 in which modified contour members 60A extend between secondary skin 40A and primary skin 30A. The contour members 60A may be thin rods of aluminum alloy pivotally mounted at their upper ends to the secondary skin 40A as indicated at 62. Their lower ends are provided with flanges 64 which are slidingly received within tracks 66 in the upper surface 20 of the primary skin 30. In this fashion, the contour members 60A are tensioned when fluid is introduced into the cavity 50, but fold down into the tracks 66 when the secondary skin 40A assumes the deflated position indicated by dotted lines in FIG. 6.

In order to improve upon the fluid holding integrity of the cavity 50, it may be desirable to apply a seal member 68 to the lateral extremities of the secondary skin 40. As seen in FIG. 7, the seal 68 may be of rubberized reinforced dacron fabric or other suitable material bonded to the respective skins 30 and 40. In the alternative, as illustrated in FIG. 8, one or more fully contained bladders 70 may be received within the cavity 50 and suitably bonded to the skins 30 and 40.

In operation, when it is desired that the aircraft utilizing the invention operate at low speed, the actuating mechanism 52 is moved to the relaxed position and pressurized fluid is introduced into the cavity to enable the secondary skin 40 to assume the position illustrated in FIG. 3. Simultaneously, the flaps 36 and 38 assume their lowered attitudes. The contour members 60 serve to stabilize the skin 40 and provide the entire upper surface of the airfoil 20 with a continuous, smooth, unbroken surface, enhancing the effect of the lowered flaps thereby eliminating turbulence across the airfoil and maintaining laminar flow. The result is that the aircraft can fly more slowly with greater safety than could be achieved previously.

On the other hand, when it is desired for the aircraft to proceed to high speed flight, the introduction of pressurized air into the cavity 50 ceases. The actuating mechanism 52 then applies tension to the secondary skin 40 and draws it down into contiguous relationship with the upper surface 32, squeezing out the air from within the cavity 50. Simultaneously, the flaps 36 and 38 are raised and the airfoil assumes the attitude illustrated in FIG. 2 for high speed flight.

While the preferred embodiments of the invention have been disclosed in detail, it should be understood by those skilled in the art that various modifications may be made to the illustrated embodiments without departing from the spirit and the scope thereof as described in the specification and defined in the appended claims.

I claim:

1. In an airfoil including a main supporting section having a laterally extending forward spar, a substantially coplanar laterally extending aft spar longitudinally spaced therefrom, a primary skin covering said main supporting section and defining upper and lower surfaces, a leading edge flap pivotally mounted to said forward spar for movement between a raised, high speed attitude and a lowered, low speed attitude, and a trailing edge flap pivotally mounted to said aft spar for movement between a raised, high speed attitude and a lowered, low speed attitude, the improvement comprising:

a secondary skin having a leading edge and a trailing edge covering at least a portion of said upper surface of said main supporting section and defining a cavity therebetween adapted to receive high pressure fluid;

hinge means pivotally mounting said leading edge of said secondary skin to said forward spar;

actuating means within said main supporting section attached to said trailing edge of said secondary skin for applying tension thereto, said actuating means being movable between a tensioning position for drawing said secondary skin into a deflated, high speed condition in contiguous relationship with said upper surface of said main supporting section and a relaxed position permitting said secondary skin to assume an inflated, low speed condition spaced from said upper surface when said high pressure fluid is received within the cavity; and a plurality of spaced apart elongated contour members located within the cavity mounted at their ends to said secondary skin and to said upper surface of said main supporting section, respectively, each of said contour members being movable between an inactive position sandwiched between said secondary skin and said upper surface when said actuating means is in said tensioning position and an active position extending transverse thereto for defining the contour of said secondary skin when said secondary skin assumes said inflated position;

whereby said secondary skin assumes said inflated condition when said leading edge flap and said trailing edge flap are in said lowered attitude for low speed flight and whereby said secondary skin assumes said deflated condition when said leading edge flap and said trailing edge flap are in said raised attitude for high speed flight.

2. In an airfoil as set forth in claim 1 the improvement wherein each of said leading edge flap, said trailing flap and said secondary skin has an upper surface and wherein said upper surfaces together define a substantially smooth, continuous, and unbroken upper surface for said airfoil during both said high speed flight attitude and said low speed flight attitude.

3. In an airfoil as set forth in claim 1, the improvement wherein said actuating means includes an actuator mounted on said main supporting section and linkage pivotally mounted to said main supporting section and to said trailing edge of said secondary skin, said actuator coupled to said linkage for movement between said tensioning position and said relaxed position.

4. In an airfoil as set forth in claim 3, the improvement wherein said actuator is a fluid powered motor.

5. In an airfoil as set forth in claim 3, the improvement wherein said actuator is an electric motor.

6. In an airfoil as set forth in claim 1, the improvement wherein said contour members are composed of high tensile strength flexible filamentary material bonded at their ends by high strength adhesive to said secondary skin and to said upper surface of said main supporting section, respectively.

7. In an airfoil as set forth in claim 1, the improvement wherein said secondary skin has an inner surface and wherein each of said contour members is a tension rod pivotally connected at one end to said inner surface and wherein said upper surface of said primary skin has a plurality of integral longitudinally extending tracks for guidingly engaging the other end of each said tension rod for movement therealong of said other end.

8. In an airfoil as set forth in claim 1, the improvement including bladder means within the cavity for retaining said high pressure fluid therein.

9. In an airfoil as set forth in claim 2, the improvement wherein each of said contour members is of a unique, predetermined length to achieve said substantially smooth, continuous and unbroken upper surface for said airfoil during said low speed flight attitude.

* * * * *